Sept. 2, 1924.  
R. MANCHA  
1,506,849  
METHOD OF HANDLING STORAGE BATTERIES OF ELECTRIC LOCOMOTIVES  
Filed Feb. 11, 1924     2 Sheets-Sheet 2
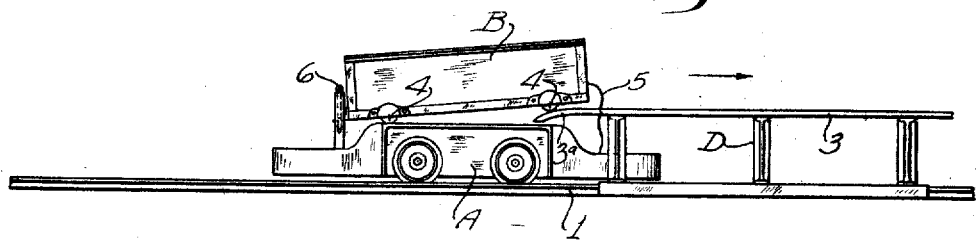
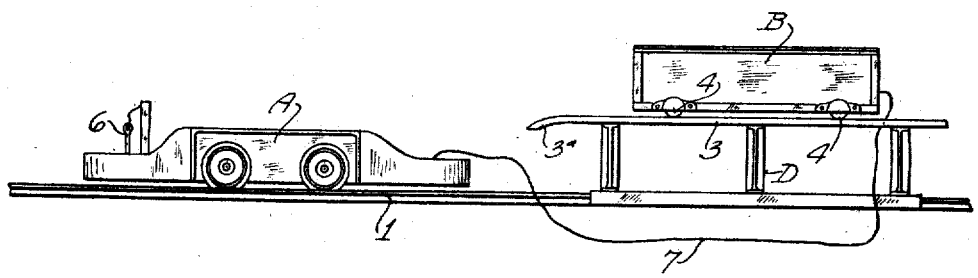
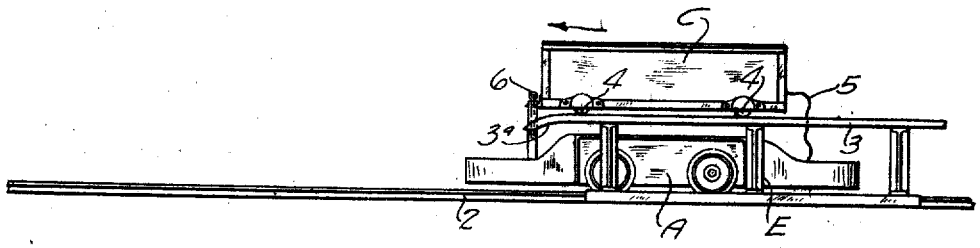
INVENTOR  
Raymond Mancha.  
BY Bakewell Church  
ATTORNEYS Patented Sept. 2, 1924.

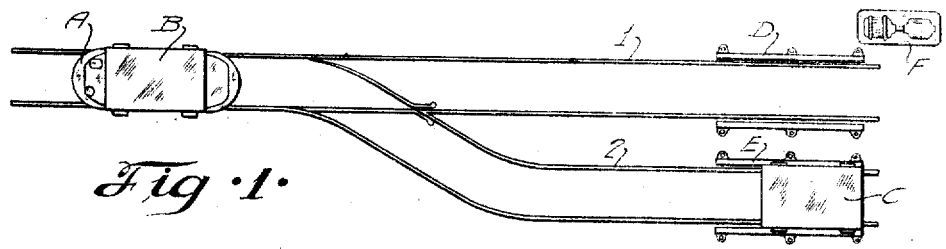
Fig·1·
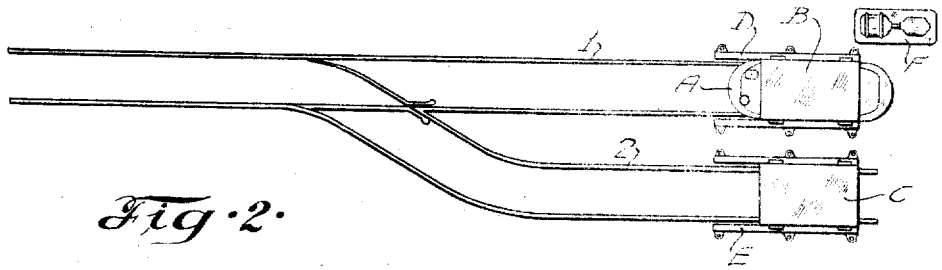
Fig·2·
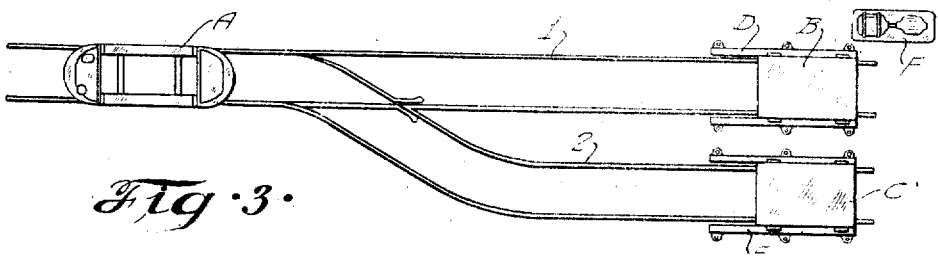
Fig·3·
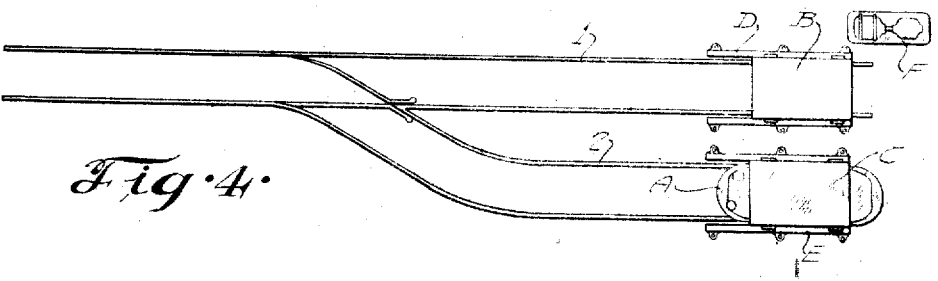
Fig·4·
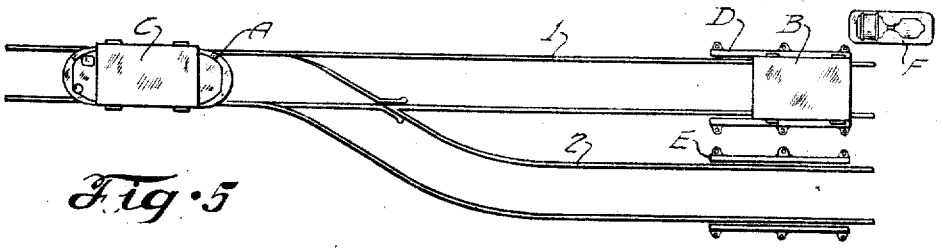
Fig·5

1,506,849

UNITED STATES PATENT OFFICE.

RAYMOND MANCHA, OF ST. LOUIS, MISSOURI, ASSIGNOR TO MANCHA STORAGE BATTERY LOCOMOTIVE COMPANY, OF ST. LOUIS, MISSOURI, A CORPORATION OF DELAWARE.

METHOD OF HANDLING STORAGE BATTERIES OF ELECTRIC LOCOMOTIVES.

Application filed February 11, 1924. Serial No. 692,166.

*To all whom it may concern:*

Be it known that I, RAYMOND MANCHA, a citizen of the United States, residing at St. Louis, Missouri, have invented a certain new and useful Improvement in Methods of Handling Storage Batteries of Electric Locomotives, of which the following is a full, clear, and exact description, such as will enable others skilled in the art to which it appertains to make and use the same.

This invention relates primarily to electric storage battery locomotives of the type in which the battery is housed in a battery box that is removably mounted on the chassis of the locomotive in such a way that it can be removed when the battery becomes discharged and replaced by a battery box that contains a charged battery.

The batteries that are used to operate electric locomotives of the kind referred to are difficult to handle, as they vary in weight from 1,000 lbs. to 14,000 lbs. and vary in size from 36 inches to 81 inches in breadth by 36 inches to 120 inches in length. Prior to my invention it was the usual practice to use a block and tackle to remove a discharged battery from the chassis of an electric locomotive and to arrange a charged battery in operative position on the chassis, but this method of changing batteries is slow and laborious and requires the services of careful and experienced workmen, in order to prevent injury to the batteries, caused by subjecting the batteries to a severe jolt or jar.

The main object of my invention is to provide a method of handling the batteries of electric locomotives of the general type referred to by which a discharged battery can be removed and replaced by a charged battery in a fraction of the time required to dismount and mount a battery with a block and tackle or similar apparatus and without liability of injuring the batteries.

Another object is to provide a method of handling the batteries of electric locomotives by which the motorman in charge of the locomotive can effect the removal of a discharged battery and the mounting of a charged battery, thereby materially reducing the cost of changing the batteries of electric locomotives.

And still another object is to provide a method of handling the batteries of electric locomotives which makes it possible for the motorman in charge of a locomotive whose battery requires re-charging to run the locomotive to a charging station, transfer the discharged battery from the chassis of the locomotive onto a supporting structure that is adapted to sustain the battery while it is being re-charged, then run the locomotive into proximity to a charged battery, and thereafter mount said charged battery on the chassis of the locomotive.

In practicing my method I prefer to use the movement of the locomotive relative to a battery supporting structure to effect the removal of a discharged battery from the locomotive and to effect the mounting of a charged battery on the locomotive, and I also prefer to use the operating mechanism of the locomotive to propel it to the point where it receives the charged battery. I wish it to be understood, however, that my present invention is not restricted to use with any particular type or kind of apparatus.

Figures 1 to 5, inclusive, are diagrammatic views, illustrating the various steps in the operation of removing a discharged battery from the chassis of an electric locomotive and mounting a charged battery on said chassis.

Figure 6 is a side elevational view, illustrating the operation of transferring a discharged battery from the chassis of an electric locomotive onto a supporting structure on which the battery is sustained while it is being re-charged.

Figure 7 is a side elevational view, illustrating the locomotive moving away from said battery supporting structure towards the place where the charged battery is to be mounted on the locomotive; and Figure 8 is a side elevational view, illustrating the operation of mounting a charged battery on the chassis of the locomotive.

In the drawings, A designates an electric locomotive of the type that is adapted to be operated by a storage battery that is removably mounted on the chassis of the locomotive, B designates a discharged battery, C designates a charged battery, D designates a battery supporting structure arranged adjacent a track 1 on which the locomotive is adapted to travel, E designates a second battery supporting structure arranged adjacent another track 2 on which the locomotive is adapted to travel and F designates a charging apparatus arranged in sufficiently close proximity to the battery supporting structures D and E to enable said charging apparatus to be electrically connected with storage batteries sustained by said supporting structures.

The battery supporting structures D and E are of such design that a discharged battery can be removed from the locomotive and deposited on the supporting structure D by the movement of the locomotive relative to said structure, and a charged battery can be moved from the supporting structure E onto the locomotive by the movement of the locomotive relative to said supporting structure E. Various types and kinds of battery supporting structures can be used for accomplishing this result, and therefore, I have herein illustrated each of the battery supporting structures as consisting of two parallel supporting members 3 arranged in spaced relation above a track on which the locomotive can travel and so disposed with relation to the rails of said track that the movement of the locomotive over said track in one direction causes a discharged battery on the locomotive to be engaged by the members 3 and moved upwardly away from the chassis, and movement of said locomotive over said track in the opposite direction can be utilized to effect the re-mounting of said battery on the locomotive. Thus, as shown in Figures 6, 7 and 8, the supporting members 3 of each battery supporting structure can be arranged horizontally or slightly inclined above the rails of the track with which they co-operate and provided at one end with inclined portions 3ª that co-operate with rollers 4 on the sides of the battery box to raise or lower the battery box with respect to the chassis of the locomotive. In my pending application for patent for charging station for storage battery locomotives, Serial No. 662,211, filed September 12, 1923, I have illustrated a battery supporting structure of this general design, which I have found to be very satisfactory for effecting the removal of a discharged battery from the chassis of a locomotive and for effecting the mounting of a charged battery, but I wish it to be understood that my invention is not restricted to use with any particular type or kind of battery supporting structure. For example, while I have herein stated that the members 3 of the battery supporting structure are inclined or provided with inclined portions that co-operate with rollers on the battery box to raise and lower the battery box, it will be obvious that the rails of the track on which the locomotive travels, during the operation of dismounting or mounting a battery, might be inclined relative to the parts of the supporting structure on which the battery is sustained, and furthermore, that instead of providing the battery box with rollers that co-operate with spaced members on the battery supporting structure to effect the raising or lowering of the battery relative to the chassis of the locomotive, the supporting structure might be provided with rollers that co-operate with laterally-projecting devices on the sides of the battery box.

In describing my present invention I will assume that the battery B of the locomotive A, shown in Figure 1, requires re-charging and that the supporting structure E sustains a charged battery C. The first step in the operation of removing the discharged battery from the locomotive and replacing it with a charged battery is to run the locomotive onto the track 1, as shown in Figure 2, so as to cause said discharged battery to be lifted from the chassis and deposited on the supporting structure D. As the locomotive approaches said supporting structure the rollers 4 on the rear end of the battery box engage the inclined portions 3ª of the supporting members 3 of the supporting structure D, as shown in Figure 6, and as the locomotive continues to move in the direction indicated by the arrow in Figure 6, the battery box will be raised gradually from the chassis of the locomotive as said battery box travels over the supporting structure D. By the time the battery box reaches the position shown in Figure 2 it will have been raised clear of the chassis and supported entirely by the members 3 of the supporting structure D. In this operation the electrical connection between the battery B and the operating mechanism of the locomotive is maintained so as to enable the discharged battery B to be used to propel the locomotive longitudinally of the supporting structure D, and the battery box is mechanically connected with the chassis of the locomotive so as to cause the movement of the locomotive to be transmitted to the battery box to push it longitudinally over the supporting structure D in the direction indicated by the arrow in Figure 6. Accordingly, in Figure 6 I have illustrated the battery B as being electrically connected with the operating mechanism of the locomotive by the electrical conductor 5 that is normally used for establishing electrical connection between said parts when the locomotive is in normal operation, and I have shown the front end of the battery box as being mechanically connected with the chassis of the locomotive by a removable pin 6 that is arranged in engagement with devices on the battery box and on the chassis.

After the discharged battery B has been transferred from the locomotive onto the support D, the electrical connection between said battery and the operating mechanism of the locomotive is broken by withdrawing the plug of the conductor 5 from its co-operating socket on the chassis. The chassis of the locomotive is then moved away from the supporting structure D into proximity to the supporting structure E so as to enable the charged battery C to be transferred from the supporting structure E onto the chassis of the locomotive. Any suitable source of electrical energy can be used to energize the operating mechanism of the locomotive while the locomotive is being run from the supporting structure D on which the discharged battery was deposited into proximity to the supporting structure E that sustains the charged battery, and in fact, any means can be employed to effect this movement of the locomotive. Generally, I use a long cable 7, as shown in Figure 7, to establish electrical connection between the operating mechanism of the locomotive and the discharged battery B on the supporting structure D when the locomotive is being run to the point where the charged battery is mounted on same, as there is usually enough energy in the discharged battery to propel the locomotive this distance. Accordingly, while I have herein used the term "discharged" in the specification and claims to designate the battery B, I wish it to be understood that this term is used in a relative sense to mean a battery that is low or which requires re-charging, and is not used as a limitation to mean a battery that has been completely exhausted.

After the cable 7 has been connected with the operating mechanism of the locomotive and with the discharged battery B, as previously described, the chassis is moved over the track 1 away from the supporting structure D, as shown in Figure 3, and is then switched onto the track 2 and moved over said track into such a position that it is located directly underneath the charged battery on the supporting structure E, as shown in Figures 4 and 8. The cable 7 is then disconnected from the operating mechanism of the chassis and from the discharged battery B and said charged battery is electrically connected with the charging apparatus F, so that it will be charged while it is sustained by the supporting structure D. In the operation of mounting the charged battery C on the chassis of the locomotive it is preferable to use said charged battery to energize the operating mechanism of the locomotive, and it is also preferable to mechanically connect the battery box with the chassis of the locomotive in such a way as to pull or push the charged battery from the supporting structure E onto the chassis of the locomotive. Accordingly, in Figure 8 I have shown the battery C as being electrically connected with the operating mechanism of the locomotive by means of an electrical conductor 5, and the battery box as being mechanically connected with the chassis by means of the removable pins 6, previously referred to. To transfer the charged battery C from the supporting structure E onto the chassis of the locomotive the locomotive is moved in the direction indicated by the arrow in Figure 8, thereby causing the battery C to move longitudinally of the supporting structure E and lowered gradually onto the chassis of the locomotive as the locomotive travels over the track 2, the rollers 4 on the battery box co-operating with the inclined portions 3ª of the members 3 of the supporting structure E to lower the battery onto the chassis without subjecting the battery to a shock or jar.

While the locomotive is being operated by the electrical energy provided by the battery C, the battery B is being re-charged by the charging apparatus, and when the battery C requires re-charging, the locomotive is then returned to the supporting structure E, the battery C is transferred from the chassis of the locomotive onto said supporting structure and the locomotive chassis is then moved into proximity to the supporting structure D and the battery B which has been on charge is then mounted on the chassis of the locomotive. While I have herein stated that a mechanical connection is made between the chassis of the locomotive and the battery box during the operation of mounting a charged battery on the chassis, this is not always necessary, for if desired, the structure on which the battery is sustained while it is being re-charged might be constructed in such a way that gravity could be used to move the charged battery over said supporting structure and deposit said charged battery on the chassis of the locomotive. Moreover, while I have herein illustrated only two battery supporting structures, it will be understood that any desired number of battery supporting structures might be used and said structures arranged in such a way that a locomotive can be moved into operative relationship with any one of same.

Having thus described my invention, what I claim as new and desire to secure by Letters Patent is:

1. A method of handling the storage batteries of electric locomotives, characterized by moving a locomotive containing a discharged battery into proximity to a supporting structure, causing one end of the battery box to engage said structure, and thereafter moving the battery box onto said structure and simultaneously lifting said box from the locomotive.

2. A method of handling the storage batteries of electric locomotives, characterized by moving a locomotive containing a discharged battery into proximity to a supporting structure, and utilizing the movement of the locomotive relative to said structure to cause the battery to move upwardly away from the locomotive and become deposited on said structure.

3. A method of handling the storage batteries of electric locomotives, characterized by moving a locomotive containing a discharged battery into proximity to a supporting structure, utilizing the movement of the locomotive relative to said structure to transfer the battery onto said structure, and charging the battery while it is supported on said structure.

4. A method of handling the storage batteries of electric locomotives, characterized by moving a locomotive containing a discharged battery into proximity to a supporting structure, transferring the battery from the locomotive onto said structure without breaking the electrical connection between the battery and the operating mechanism of the locomotive, then disconnecting the operating mechanism of the motor from the battery, and thereafter connecting the battery with a charging apparatus.

5. A method of handling the storage batteries of electric locomotives, characterized by moving a locomotive containing a discharged battery into proximity to a supporting structure, using said battery to energize the operating mechanism of the locomotive to move the locomotive relative to said structure, and causing co-operating devices on the supporting structure and the battery box to act while the locomotive is moving relatively to said structure to effect the separation of the battery box from the chassis of the locomotive.

6. A method of handling the storage batteries of electric locomotives, characterized by moving a locomotive containing a discharged battery into proximity to a supporting structure, pushing the battery onto said supporting structure by the movement of the locomotive and simultaneously moving one of said elements vertically relative to the other so as to disconnect the battery box from the locomotive, then breaking the electrical connection between the battery and the operating mechanism of the locomotive, and thereafter re-charging the battery while it is sustained by said supporting structure.

7. A method of handling the storage batteries of electric locomotives, characterized by moving a locomotive chassis underneath a supporting structure that contains a charged battery, establishing electrical connection between said battery and the operating mechanism of said chassis, coupling the battery box with said chassis, and then causing the chassis to move in a direction to cause the battery to be transferred from the supporting structure onto said chassis.

8. A method of handling the storage batteries of electric locomotives, characterized by moving a locomotive containing a discharged battery into proximity to a supporting structure, lifting the battery from the chassis of the locomotive and depositing it on said structure while the locomotive is moving relative to said structure, connecting the operating mechanism of the locomotive with a source of electrical energy and moving the locomotive into proximity to a second supporting structure that sustains a charged battery, transferring said charged battery from said structure onto the chassis of the locomotive while the locomotive is moving relatively to said structure, and then re-charging the discharged battery while the locomotive is being operated by said charged battery.

9. A method of handling the storage batteries of electric locomotives, characterized by moving a locomotive containing a discharged battery onto a track, lifting said discharged battery from the locomotive and sustaining it in an elevated position while it is being re-charged, moving the locomotive away from said discharged battery and running it onto a second track, and lowering a charged battery onto the locomotive while the locomotive is traveling over said second track.

10. A method of handling the storage batteries of electric locomotives, characterized by moving a locomotive containing a discharged battery onto a track, causing a means that is arranged above said track to engage the battery box and effect the separation of the battery box from the chassis while the locomotive is traveling over said track, then moving the chassis onto a track or a section of track that extends under a charged battery which is sustained in an elevated position, and thereafter causing said charged battery to be deposited on the chassis of the locomotive.

11. A method of handling the storage batteries of electric locomotives, characterized by moving a locomotive containing a discharged battery into proximity to a supporting structure, utilizing the movement of the locomotive relative to said structure to deposit the battery on said structure, then moving the locomotive chassis into proximity to a supporting structure that sustains a charged battery, and utilizing the movement of the chassis relative to said second supporting structure to transfer the charged battery onto the chassis.

12. A method of handling the storage batteries of electric locomotives, characterized by moving a locomotive containing a discharged battery into proximity to a supporting structure, transferring the battery from the locomotive onto said structure, using said discharged battery to energize the operating mechanism of the locomotive to cause it to move into proximity to a second supporting structure that sustains a charged battery, and using said charged battery to energize the operating mechanism of the chassis to cause it to move in a direction to effect the transfer of said charged battery onto said chassis.

13. A method of handling the storage batteries of electric locomotives, characterized by moving a locomotive containing a discharged battery into proximity to a supporting structure, transferring the battery onto said supporting structure, then establishing electrical connection between said battery and the operating mechanism of the chassis and moving the chassis into proximity to a second supporting structure that sustains a charged battery, then breaking the electrical connection between the discharged battery and the operating mechanism of the locomotive and establishing electrical connection between said operating mechanism and the charged battery, and thereafter moving the chassis in a direction to cause the charged battery to be transferred onto the chassis.

14. A method of handling the storage batteries of electric locomotives, characterized by moving a locomotive containing a discharged battery into proximity to a supporting structure and transferring the battery onto said structure by moving the locomotive relatively to said structure after one end of the battery box has been engaged by said structure, establishing electrical connection between said discharged battery and the operating mechanism of the locomotive by means of a cable, then moving the locomotive chassis into proximity to a supporting structure that sustain a charged battery then disconnecting said cable from the operating mechanism of the chassis and establishing electrical connection between said mechanism and the charged battery, and thereafter causing the locomotive chassis and the charged battery to move relatively to said second supporting structure in such a way that the charged battery will be deposited on the chassis.

15. A method of handling the storage batteries of electric locomotives, characterized by moving a locomotive containing a discharged battery into proximity to a supporting structure that is adapted to sustain the battery while it is being re-charged, sliding the battery onto said supporting structure and causing it to move vertically relative to the locomotive whereby the locomotive chassis will be free to move away from said structure without disturbing the discharged battery, using a cable to establish electrical connection between the operating mechanism of the chassis and a source of electrical energy, then moving the chassis into proximity to a second supporting structure that sustains a charged battery, and thereafter moving the chassis in a direction to cause the charged battery to be moved gradually onto the chassis.

RAYMOND MANCHA.